(12) United States Patent
Liberfarb

(10) Patent No.: US 6,167,906 B1
(45) Date of Patent: Jan. 2, 2001

(54) BI-DIRECTIONAL FLOW CONTROL VALVE

(75) Inventor: Zilek Liberfarb, Morton Grove, IL (US)

(73) Assignee: HydraForce, Inc., Lincolnshire, IL (US)

( * ) Notice: Under 35 U.S.C. 154(b), the term of this patent shall be extended for 0 days.

(21) Appl. No.: 09/344,689

(22) Filed: Jun. 25, 1999

Related U.S. Application Data

(60) Provisional application No. 60/093,933, filed on Jul. 23, 1998.

(51) Int. Cl.[7] ................................................. F16K 31/363
(52) U.S. Cl. .......................................................... 137/501
(58) Field of Search .................................... 137/501, 500, 137/503, 504

(56) References Cited

U.S. PATENT DOCUMENTS

| | | | |
|---|---|---|---|
| 4,630,640 | * 12/1986 | DiBartolo | 137/501 |
| 5,086,877 | * 2/1992 | Synatschke et al. | 137/501 X |
| 5,878,766 | * 3/1999 | Dekhtyar | 137/501 X |

* cited by examiner

Primary Examiner—Kevin Lee
(74) Attorney, Agent, or Firm—Leydig, Voit & Mayer, Ltd.

(57) ABSTRACT

A bi-directional flow control valve includes a two-port housing, and a hollow cage within the housing. The hollow cage has rows of cross-sectional holes that communicate with the ports. A hollow compensating spool is slidably arranged within the hollow cage between the cross-sectional holes. Pressure differential between the ports induces movement in the compensating spool. This movement causes the compensating spool to reduce the opening of one row of cross-sectional holes and increase the opening of the other. In this manner, the valve provides consistent flow control characteristics in each flow direction.

13 Claims, 1 Drawing Sheet

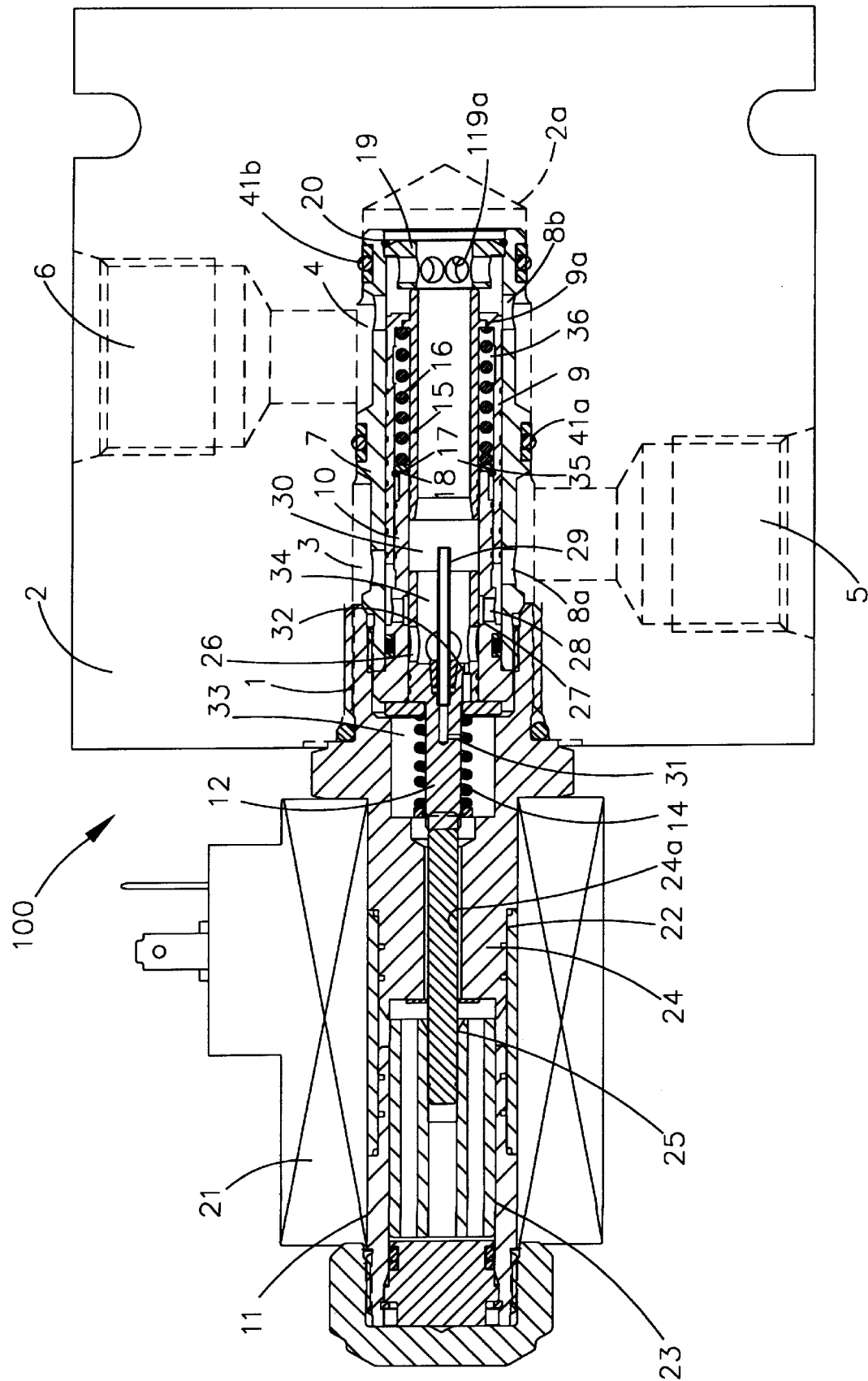

BI-DIRECTIONAL FLOW CONTROL VALVE

CROSS REFERENCE TO RELATED APPLICATIONS

Priority is claimed to the provisional application Ser. No. 60/093,933 filed Jul. 23, 1998, for a Bi-Directional Flow Control Valve.

FIELD OF THE INVENTION

The present invention relates generally to valves and, more particularly, to a bi-directional flow control valve which provides improved flow control characteristics.

BACKGROUND OF THE INVENTION

Flow control valves are frequently used to regulate flow through piping systems and the like. In one type of flow control valve, an electromagnetic actuator in the form of a solenoid is utilized to regulate flow through a cooperating valve assembly. Such actuators ordinarily comprise a hollow guide tube with a passageway formed therein, an electrically energizable solenoid coil wrapped around the guide tube, and a magnetic armature or a plunger slidably disposed within the passageway of the guide tube and interacting with the valve assembly. When an electric current is passed through the solenoid coil, a magnetic field (or flux) is produced within the guide tube which moves the armature along the passageway and causes flow through the valve assembly which is proportional to the current applied to the coil. Such flow control valves provide controllable flow in one flow direction, from an inlet port to an outlet port, but not in the opposite direction. In fact, when the flow direction reverses, such flow control valves usually provide a restricted or free flow in the opposite direction.

OBJECTS OF THE INVENTION

Accordingly, a general object of the present invention is to provide a bi-directional flow control valve with controllable flow control characteristics in opposite flow directions.

A more specific object of the present invention is to provide a bi-directional flow control valve with substantially identical flow control characteristics in opposite flow directions.

A related object of the present invention is to provide a bi-directional flow control valve which achieves a substantially constant "flow versus current" relationship in either flow direction.

Another object of the present invention is to provide a bi-directional flow control valve which achieves precise flow control.

An additional object of the present invention is to provide a flow control valve as characterized above which is reliable, durable, and convenient to use.

SUMMARY OF THE INVENTION

In accordance with these and other objects, a bi-directional flow control valve is disclosed herein. The inventive flow control valve comprises a valve assembly which is supported by a housing at one end and confines an electro-magnetic actuator at the other end. The valve assembly includes a hollow cage that cooperates with a cavity formed in the housing to define a plurality of internal chambers, a hollow compensating spool slidably arranged within the cage between rows of cross-sectional holes formed in the cage, a hollow guide member slidably arranged within the compensating spool and having cross-holes formed therein, and regulating and dampening spools slidably arranged within the guide member at opposite ends thereof. The internal chambers of the housing communicate with respective ports formed in the housing to provide a two-port flow configuration. The actuator includes a solenoid coil wound around a hollow guide tube, a movable plunger or armature slidably arranged within the guide tube, a pole piece anchored within the guide tube, and a push pin attached to and extending from the armature and engaging the regulating spool of the valve assembly.

When the solenoid coil of the actuator is electrically energized with current, the armature of the actuator moves toward the pole piece which causes the regulating spool of the valve assembly to move between first and second operating positions. In the first operating position, cross-holes formed in the regulating spool are out of alignment with cross-holes formed in the guide member which blocks flow between the ports of the housing. In the second operating position, the cross-holes of the regulating spool are at least partially aligned with the cross-holes of the guide member which permits flow between the ports of the housing.

The pressure differential across the flow control valve and the direction of flow between the ports induces movement in the compensating spool in a direction either towards or away from the actuator. In either event, the compensating spool reduces the opening of one of the rows and increases the opening of the opposite row of cross-sectional holes of the cage in a manner proportional to the pressure differential between the ports, while the pressure differential between opposite sides of the spool remains substantially the same. On account of this construction, the inventive flow control valve provides precise flow control and consistent flow control characteristics in each flow direction including, for example, a substantially constant "flow versus current" relationship.

These and other objects, features, and advantages of the present invention will become more readily apparent upon reading the following detailed description of the preferred exemplified embodiment and upon reference to the accompanying drawing wherein:

BRIEF DESCRIPTION OF THE DRAWING

The drawing is a cross-sectional view of a bi-directional flow control valve in accordance with the present invention.

DETAILED DESCRIPTION OF THE PREFERRED EMBODIMENT

Priority is claimed to the provisional application Ser. No. 60/093,933 filed Jul. 28, 1998, which is incorporated herein by reference in its entirety.

Turning now to the drawing, a bi-directional flow control valve constructed in accordance with the teachings of the present invention is designated generally by reference numeral 100. In the illustrated embodiment, the flow control valve 100 comprises a valve assembly 1 which is supported by a housing 2 at one end and confines an electro-magnetic actuator 11 at the other end. As shown in the drawing, the valve assembly 1 is received by a longitudinal cavity 2a formed within the housing 2 and includes a hollow cage 7 that cooperates with the longitudinal cavity 2a to define a pair of internal chambers 3 and 4. The housing 2 also has a pair of offset ports 5 and 6 formed therein which communicate with internal chambers 3 and 4, respectively, to provide a two-port flow configuration.

The cage 7 of the valve assembly 1 is generally cylindrical in configuration and is supported within and against the longitudinal cavity 2a of the housing 2 by a pair of spaced apart sealing members such as O-rings 41a and 41b or the like. The cage 7 also has two rows of cross-sectional holes 8a and 8b formed therein.

In addition to the cage 7, the valve assembly 1 also includes a hollow compensating spool 9 which is slidably arranged within the cage 7 between the two rows of cross-sectional holes 8a and 8b, a hollow guide member 10 which is slidably arranged within the compensating spool 9, a hollow regulating spool 12 having an internal chamber 34 and a dampening spool 15 having an internal chamber 35. The regulating spool 12 and the dampening spool 15 are arranged at opposite ends of the guide member 10. One end of the dampening spool 15 engages a stop member 19 which is acted upon by a spring ring 20, and the other end of the dampening spool 15 is slidably received within the guide member 10. An internal void 30 is defined by the guide member 10 between the internal chamber 34 and the internal chamber 35.

A regulating spring 14 biases the regulating spool 12 in a first operating position with respect to the guide member 10, as shown, for example, in the drawing. A compensating spring 16 is disposed within an enclosure 36 defined by the compensating spool 9, the dampening spool 15 and the guide 10, and biases the compensating spool 9 in an intermediate position between the cross-sectional holes 8a and 8b of the cage 7. In the illustrated embodiment, the regulating spring 14 is arranged within a cavity 33 existing between the valve assembly 1 and the regulating spool 12. One end of the compensating spring 16 engages a washer 17 that abuts the guide member 10 and is supported by a spring ring 18, and the other end of the compensating spring 16 engages annular shoulders 9a and 15a formed on the compensating spool 9 and on the dampening spool 15.

A plurality of cross-holes 26 are formed in the regulating spool 12 and a cooperating groove 27 and associated cross-holes 28 are formed in the guide member 10. When the regulating spool 12 is in the first operating position, as shown, for example, in the drawing, the cross-holes 26 of the regulating spool 12 are out of alignment with the groove 27 and cross-holes 28 of the guide member 10. A shaft or tube member 29 which projects from the regulating spool 12 into the internal void 30 communicates with a first orifice 31 in the regulating spool 12 to provided a first fluid path between the cavity 33 and the internal void 30. A second orifice 32 in the regulating spool 12 communicates with the void 30 and the cavity 33 to provide a second fluid path therebetween.

The electro-magnetic actuator 11 includes a solenoid coil 21 wound around a hollow guide tube 22, a movable plunger or armature 23 slidably arranged within the guide tube 22, and a pole piece 24 anchored within the guide tube 22. The armature 23 and pole piece 24 are preferably fabricated from a magnetic material, such as soft iron. While other constructions are permissible and would fall within the scope and spirit of the present invention, the pole piece 24 of the illustrated embodiment forms an integral part of the valve assembly 1.

When the solenoid coil 21 is electrically energized with current, a magnetic field (or flux) is produced within the guide tube 22 which exerts a longitudinal force on the armature 23. This longitudinal force is proportional to the current supplied to the solenoid coil 21 and causes the armature 23 to move within the guide tube 22 in the direction of the pole piece 24. A magnetic attractive force between the armature 23 and the pole piece 24 exerts a second longitudinal force on the armature 23 which supplements the longitudinal force provided by the solenoid coil 21.

A push pin 25 is attached to and extends from the armature 23 of the actuator 11. This push pin 25 is also received within a longitudinal aperture 24a of the pole piece 24 for engagement with the regulating spool 12 of the valve assembly 1. When the solenoid coil 21 is electrically energized, the armature 23 moves toward the pole piece 24 while the attached push pin 25 counteracts the biasing provided by the regulating spring 14 and pushes the regulating spool 12 toward a second operating position with respect to the guide member 10. In the second operating position, the cross-holes 26 of the regulating spool 12 are at least partially aligned with the groove 27 and cross-holes 28 of the guide member 10. Of course, this movement of the regulating spool 12 between the first and second operating positions and the resulting scope of communication between the cross-holes 26 of the regulating spool 12 and the cross-holes 28 of the guide tube 10 are proportional to the current supplied to the solenoid coil 21.

Flow is supplied to the control valve 100 through either port 5 or port 6 for transmission through port 6 or port 5, respectively. When the regulating spool 12 is in the second operating position, the cross-holes 26 of the regulating spool 12 and the cross-holes 28 of the guide tube 10 are at least partially aligned which permits flow between ports 5 and 6. In fact, a continuous flow path is provided from port 5 of the housing 2, through internal chamber 3, through the cross-sectional holes 8a of the cage 7, through the cross-holes 28 of the guide tube 10, through the cross-holes 26 of the regulating spool 12, through the internal void 34 of the regulating spool 12, through the internal void 30 of the guide tube 10, through the internal void 35 of the dampening spool 15, through holes 19a formed in the stop member 19, through the cross-sectional holes 8b of the cage 7, through internal chamber 4, and through port 6 of the housing 2. When the regulating spool 12 is in the first operating position, however, the cross-holes 26 of the regulating spool 12 and the cross-holes 28 of the guide tube 10 are out of alignment which blocks or prevents flow between ports 5 and 6 by interrupting the continuous flow path therebetween. As such, the flow control valve 100 of the illustrated embodiment has a "normally closed" configuration which provides no communication between the cross-holes 26 of the regulating spool 12 and the groove 27 and cross-holes 28 of the guide member 10 while the regulating spool 12 is in the first operating position and gradually expanding communication therebetween as the current supplied to the solenoid coil 21 is increased.

In accordance with an important aspect of the present invention, the pressure differential across the control valve 100 and the direction of flow between ports 5 and 6 induces movement in the compensating spool 9 which automatically regulates the flow between the ports 5 and 6. For example, when the flow direction is from port 5 to port 6, the compensating spool 9 overcomes the biasing provided by compensating spring 16 and moves from the intermediate position shown in the drawing away from the actuator 11 to reduce the opening of the cross-sectional holes 8b and increase the opening of the cross-sectional holes 8a. When the flow direction is from port 6 to port 5, on the other hand, the compensating spool 9 moves from the intermediate position shown in the drawing towards the actuator 11 to reduce the opening of the cross-sectional holes 8a and increase the opening of the cross-sectional holes 8b. In either event, the openings of the cross-sectional holes 8a and 8b of the cage 7 are reduced and increased in a manner proportional to the pressure differential between ports 5 and 6, while the pressure differential between opposite sides of the compensating spool 9 remains substantially the same, which provides precise flow control and consistent flow control characteristics in either flow direction.

In accordance with another important aspect of the present invention, a first fluid path is provided from the cavity 33 of the regulating spool 12, through the orifice 31 and the tube member 29, and into the internal void 30. A second fluid path is provided from the cavity 33, through the orifice 32 and into the internal void 30. During operation of the bi-directional flow control valve, the ability of fluid to travel through first and second paths maintain the pressure in the cavity 33 approximately mid-way between the pressure in the void 30 and the pressure in the void 34 adjacent to the cross holes 26. On account of this construction, a substantially constant "flow versus current" relationship is provided in either flow direction and a substantially constant pressure differential is maintained across the regulating spool 12 of the valve assembly 1.

In accordance with yet another important aspect of the present invention, the enclosure 36 communicates with the fluid path between the ports 5 and 6 through restrictive clearances between the dampening spool 15, guide member 10 and compensating spool 9. The enclosure 36 therefore dampens the movement of the compensating spool 9 to ensure valve stability during adverse operating conditions.

Although the flow control valve 100 of the illustrated embodiment is of specific construction, those skilled in the art will readily appreciate that other types and embodiments of bi-directional flow control valves may alternatively be employed without departing from the scope or spirit of the present invention. For example, by making certain minor modifications to the structures disclosed herein, the inventive flow control valve 100 may alternatively have a "normally open" configuration which provides communication between the cross-holes 26 of the regulating spool 12 and the groove 27 and cross-holes 28 of the guide member 10 while in the first operating position, but no communication therebetween while in the second operating position, and gradually diminishing communication therebetween as the current supplied to the solenoid coil 21 is increased. In addition, the electromagnetic actuator 11 may alternatively comprise or be replaced by some other mechanical system, such as a screw-type element or the like, which selectively provides a push-type engagement with the regulating spool 12.

What is claimed is:

1. A bi-directional flow control valve comprising
a housing having a longitudinal cavity and a pair of ports;
a cage disposed within the longitudinal cavity, the cage having an internal void and a pair of cross sectional holes, wherein when the valve is in an open position, the pair of cross-sectional holes communicates with the internal chamber and the ports to provide a flow path between the ports through the internal void;
a compensating spool slidably arranged within the cage between the ports, wherein the compensating spool responds to a fluid flowing from one of the ports to the other port along the flow path by moving to reduce the opening of one of the cross-sectional holes and increase the opening of the other cross-sectional hole in proportion to a pressure differential between the ports to control the flow of the fluid.

2. The bi-directional flow control valve of claim 1, wherein
one of the ports is a first port,
the other port is a second port,
one of the cross-sectional holes is a first cross-sectional hole communicating with the first port,
the other cross-sectional hole is a second cross-sectional hole communicating with the second port, and wherein the bi-directional flow control valve further comprises:
a means for biasing the compensating spool toward the housing, wherein the flow of fluid from the first port to the second port causes the compensating spool to overcome the biasing means and to reduce the opening of the first cross-sectional hole and increase the opening of the second cross-sectional hole.

3. The bi-directional flow control valve of claim 2, wherein the biasing means comprises a spring.

4. The bi-directional flow control valve of claim 1, wherein
one of the ports is a first port,
the other port is a second port,
one of the cross-sectional holes is a first cross-sectional hole communicating with the first port,
the other cross-sectional hole is a second cross-sectional hole communicating with the second port, and wherein the bi-directional flow control valve further comprises:
a means for biasing the compensating spool toward the housing, wherein the flow of fluid from the second port to the first port causes the compensating spool to supplement the biasing means and move to increase the opening the first cross-sectional hole and reduce the opening of the second cross-sectional hole.

5. The bi-directional flow control valve of claim 4, wherein the biasing means comprises a spring.

6. The bi-directional flow control valve of claim 1, wherein
one of the ports is a first port,
the other port is a second port,
one of the cross-sectional holes is a first cross-sectional hole communicating with the first port,
the other cross-sectional hole is a second cross-sectional hole communicating with the second port, and wherein the bi-directional flow control valve further comprises:
a regulating spool slidably arranged within the cage, wherein the regulating spool has a cross hole and an internal chamber, the internal chamber communicating with the regulating spool cross hole and the internal void of the cage; and
an electromagnetic actuator coupled to the cage opposite the housing, wherein when a current is applied to the electromagnetic actuator, a magnetic force causes the regulating spool to move to at least partially align the regulating spool cross hole with the first cross-sectional hole, such that the scope of communication between the first cross-sectional hole and the first port is proportional to the current.

7. The bi-directional control valve of claim 6, further comprising:
a dampening spool slidably arranged within the cage opposite the regulating spool, the dampening spool having an internal chamber, the internal chamber communicating with the internal void of the cage; and
a stop member engaging the dampening spool at one end thereof, the stop member having a hole communicating with the dampening spool internal chamber and the second cross-sectional hole.

8. The bi-directional flow control valve of claim 6, further comprising:

a means for biasing the regulating spool to a first position in which the regulating spool cross hole and the first cross-sectional hole remain unaligned, wherein the resulting magnetic force overcomes the biasing means to move the regulating spool to a second position in which the regulating spool cross hole and the first cross-sectional hole are at least partially aligned, such that the scope of communication between the first cross-sectional hole and the first port is proportional to the current.

9. The bi-directional flow control valve of claim 8, wherein the biasing means comprises a spring.

10. The bi-directional flow control valve of claim 6, further comprising:

a means for biasing the regulating spool to a first position in which the regulating spool cross hole and the first cross-sectional hole are at least partially aligned, wherein the resulting magnetic force overcomes the biasing means to move the regulating spool to a second position in which scope of communication between the regulating spool cross hole and the first cross-sectional hole is inversely proportional to the current.

11. The bi-directional flow control valve of claim 10, wherein the biasing means comprises a spring.

12. The bi-directional flow control valve of claim 6, wherein the regulating spool has a first orifice communicating with the regulating spool internal chamber, a tube member communicating with the first orifice and the internal void of the cage to provide a first fluid path between the regulating spool internal chamber and the internal void of the cage, and a second orifice communicating with the regulating spool internal chamber and the internal void of the cage to provide a second fluid path between the regulating spool internal chamber and the internal void of the cage.

13. The bi-directional flow control valve of claim 7, further comprising a compensating spring for biasing the compensating spool toward the housing, wherein the compensating spring is contained in an enclosure defined by the compensating spool and the dampening spool, wherein the enclosure communicates with the fluid path between the ports through restrictive clearances between the dampening spool and compensating spool.

* * * * *